United States Patent [19]

Erdman et al.

[11] 3,860,464

[45] Jan. 14, 1975

[54] OXIDE ETCHANT

[75] Inventors: William Charles Erdman, Danielsville; Victor Charles Garbarini, Bethlehem, both of Pa.

[73] Assignee: Bell Telephone Laboratories, Incorporated, Murray Hill, N.J.

[22] Filed: Oct. 11, 1973

[21] Appl. No.: 405,564

[52] U.S. Cl. ...................... 156/7, 156/17, 252/79.3, 252/79.4

[51] Int. Cl. ........................................ C09k 3/00

[58] Field of Search .............. 252/79.3, 79.4; 156/2, 156/3, 7, 8, 13, 17; 29/580

[56] References Cited

UNITED STATES PATENTS

| | | | |
|---|---|---|---|
| 3,421,985 | 1/1969 | Baker et al. | 156/17 X |
| 3,560,280 | 2/1971 | Nishida | 156/17 |

*Primary Examiner*—William A. Powell

*Attorney, Agent, or Firm*—E. M. Fink

[57] ABSTRACT

A composition for selectively etching inorganic oxides with respect to titanium includes an oxidizing agent, a buffered aqueous solution of hydrofluoric acid, a tetrazolium salt and sufficient organic solvent to make a stable solution. During the etching process, tetrazolium cations are reduced to form an etch insoluble formazan dye which deposits upon negatively charged(cathodic)sites, thereby suppressing galvanic corrosion.

8 Claims, No Drawings

OXIDE ETCHANT

This invention relates to an oxide etchant including a metal corrosion inhibitor. More particularly, the present invention relates to a hydrofluoric acid oxide etchant including a metal corrosion inhibitor comprising a tetrazolium salt.

In the fabrication of semiconductive devices it is common to use a layer of an inorganic oxide, particularly silicon oxide, as a masking or protective medium. It is also common to use reactive metals, such as titanium, in the formation of film electrodes or interconnecting conductors. Thus, titanium is commonly used as a bonding layer for adhering gold electrodes or conductors to the underlying material, usually with a barrier layer of platinum or palladium between the titanium and the gold.

In the processing of such devices, it becomes necessary to remove the oxide by an etching procedure. Etchants commonly used for this purpose tend to attack the active metal layer, causing undesirable and often disastrous undercutting of the electrodes or conductors.

In accordance with the present invention a novel titanium metal inhibited oxide etchant is described. Briefly, the inventive etchant includes four functional components. These components are (a) a buffered oxide etchant, (b) an oxidizing agent which serves to suppress hydrogen gas evolution, (c) a tetrazolium salt which functions as a reactive inhibitor to suppress the electrochemical corrosion of aluminum, nickel, titanium or analogous metals in fluoride solutions when in contact with noble metals or silicon, and (d) an organic solvent which increases and/or stabilizes the solubility of the inhibitor, so permitting reserve capacity for inhibition above the threshold requirements.

In practice, the etchant is prepared by admixture of a stock solution comprising a buffered hydrofluoric acid solution, the oxidizing agent, and the water soluble organic solvent and a tetrazolium salt of the general formula

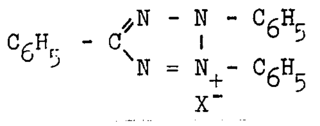

wherein X is a halogen atom selected from the group consisting of bromine, chlorine, fluorine, and iodine.

The described tetrazolium salts are completely ionized in aqueous solution and the cation is preferentially absorbed at cathodic sites, e.g., those areas on the metallization and conducting semiconductor substrate which have become negatively charged by virtue of potentials developed by galvanic action contact potentials such as p-n junctions, corrosion cell currents, and so forth. The absorbed tetrazolium cations are found to inhibit corrosion of titanium in acid solution by raising the hydrogen discharge potential and by physically hindering electrochemical surface reactions which enhance corrosion. The unique property of the tetrazolium salts which makes them superior to other organic inhibitors is their ability to be reduced by electrons generated during metal dissolution (see the Equation), so resulting in the formation of a colored, etch-insoluble formazan dye which coats the cathodic sites which are responsible for enhanced corrosion.

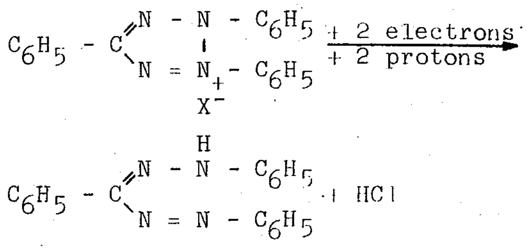

A tetrazolium salt found to be particularly useful in the practice of the present invention is

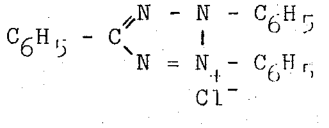

(2,3,5, triphenyl tetrazolium chloride)

It will be understood by those skilled in the art that the tetrazolium salt selected must be of sufficient solubility for the oxidized form of the compound in the buffered oxide etchant to maintain a constant available supply of dye to coat the active metal surfaces. It will also be appreciated that the tendency of exposed silicon to plate out the reduced formazan dye dictates that an excess amount of tetrazolium salt be available in solution. In practice, the tetrazolium salt is employed in solution in a concentration of approximately 0.04 percent in an amount ranging from 0.02 to 0.05 percent by volume based upon the total volume of solution.

As indicated, the buffered etchant or stock solution preferably comprises a fluoride etchant. Such compositions are readily available from commercial sources and typically contain from 50 to 60 percent by weight of a monobasic fluoride preferably ammonium fluoride, from 6.5 to 7.5 percent by weight hydrofluoric acid, remainder water. It will be readily appreciated by those skilled in the art that the ranges set forth above are dictated by considerations relating to the required stability and magnitude of the silicon dioxide etch rate.

The oxidizing agent selected for use in conjunction with the stock solution is hydrogen peroxide. Although various oxidizing agents are readily available, studies have revealed that hydrogen peroxide is the only satisfactory agent suitable for effectively depositing the formazan dye on the metal surfaces. The peroxide is employed in an amount ranging from 1.0 to 3.0 percent (of a 30 percent solution) by volume based upon the volume of the total solution, the limits being dictated by the amount required to prevent the evolution of hydrogen from the metal surface.

The solvent selected may be chosen from among any of the readily available commercial water soluble organic solvents capable of dissolving a tetrazolium salt; dimethylsulfoxide, dimethylformamide and methanol being particularly well suited for this purpose. The solvents are employed in an amount ranging from 8 to 10 percent by volume based upon the total volume of solution, such range being dictated by the concentration of solvent necessary to maintain the solubility of the tetrazolium salt at an adequate level, preferably approximately 0.05 percent, without unduly reducing the etch rate of a thermally grown $SiO_2$ film. Ordinarily, etch rates of at least 800 A/min are preferred, although slower etch rates can be tolerated where not objectionable from an economic standpoint. For slower etch rates, water can be used as the solvent.

In the practice of the present invention a stock solution comprising the buffered oxide etchant triphenyl tetrazolium chloride and an organic solvent is prepared. Immediately prior to etching, the stock solution is mixed with hydrogen peroxide to yield the desired etchant.

An exemplary embodiment of the present invention follows.

A stock solution comprising nine parts of ammonium fluoride buffered hydrofluoric acid, one-fifth (1/5) part of a solution (2 percent by weight) of 2, 3, 5, triphenyl tetrazolium chloride in water, and one part methanol was prepared. An inhibitor solution (2 percent triphenyl tetrazolium chloride) was prepared by dissolving 2.0 grams 2, 4, 5-triphenyl tetrazolium chloride in 100 ml deionized water. Prior to etching ten parts of stock solution was mixed with one part by volume of 30 percent hydrogen peroxide solution.

Etching of a silicon integrated circuit wafer was next effected in a plastic etch basket. The wafer selected was a silicon substrate having a thermally grown silicon dioxide coating and titanium-palladium-gold stripes, 0.4 ml in diameter deposited thereon together with a plurality of devices diffused through the silicon dioxide coating. Silicon was etched from those edge portions of the devices from which gold beam leads were to project, leaving beams coated on their lower sides with silicon oxide. The devices were then subjected to etching of the silicon oxide in order to remove the oxide from the beams. The basket was placed in a container of the freshly mixed etchant, and etching conducted for a period of 8 ½ minutes. Following, the etched wafer was overflow rinsed with deionized water for five minutes and spin dried. The wafer was then inspected to determine if complete removal of oxide on the backs of beams had been effected. Then the wafer was reinserted in the basket and the latter immersed in methanol for two minutes to remove the formazan dye deposit. This step was then repeated with fresh methanol followed by a rinse with deionized water for five minutes and spin drying. A representative sampling of chips from the etched wafer was examined for titanium undercutting which was found to be negligible.

What is claimed is:

1. Metal inhibited oxide etchant comprising the following components by volume based upon the total volume of etchant:

a. 1–3 percent hydrogen peroxide, 30 percent solution b. 0.02–0.05 percent tetrazolium salt, and c. buffered aqueous hydrofluoric acid solution, enough solvent being present to stabilize the solubility of the tetrazolium salt.

2. Etchant in accordance with claim 1 wherein said tetrazolium salt is of the general formula

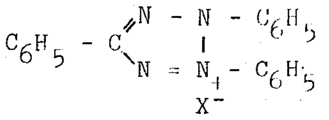

wherein X is a halogen atom.

3. Etchant in accordance with claim 2 wherein the hydrofluoric acid is buffered with ammonium fluoride.

4. Etchant in accordance with claim 2 wherein the solvent is methanol.

5. Etchant in accordance with claim 4 wherein the tetrazolium salt is triphenyl tetrazolium chloride.

6. In the fluoride etch treatment of a substrate having exposed areas of inorganic oxide soluble in said etch and a metal susceptible to attack by said etch, the improvement which comprises contacting said substrate with such fluoride etch which contains a tetrazolium salt as an inhibitor for attack of the etch on said metal.

7. Method in accordance with claim 6 wherein said etch comprises the following components by volume based upon the total volume of etchant.

a. 1–3 percent hydrogen peroxide, 30 percent solution b. 0.02 to 0.05 percent tetrazolium salt c. buffered aqueous hydrofluoric acid solution, enough solvent being present to stabilize the solution of the tetrazolium salt.

8. Method in accordance with claim 6 wherein the tetrazolium salt is of the general formula

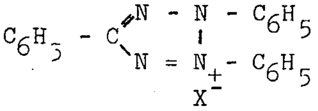

wherein X is a halogen atom.

* * * * *